(12) United States Patent
Endal

(10) Patent No.: US 6,910,830 B2
(45) Date of Patent: Jun. 28, 2005

(54) METHOD FOR PIPELAYING FROM A COIL TO THE SEA BED, CONTROLLING THERMAL EXPANSION

(75) Inventor: Geir Endal, Harstad (NO)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 10/250,656

(22) PCT Filed: Jan. 17, 2002

(86) PCT No.: PCT/NO02/00023

§ 371 (c)(1),
(2), (4) Date: Jul. 7, 2003

(87) PCT Pub. No.: WO02/057674

PCT Pub. Date: Jul. 25, 2002

(65) Prior Publication Data

US 2004/0062611 A1 Apr. 1, 2004

(30) Foreign Application Priority Data

Jan. 19, 2001 (NO) .......................................... 2001-0344

(51) Int. Cl.$^7$ .............................. F16L 1/00; F16L 51/04
(52) U.S. Cl. .................... 405/158; 405/166; 405/168.1; 138/118
(58) Field of Search ................................ 405/158, 166, 405/168.1, 168.3; 138/118

(56) References Cited

U.S. PATENT DOCUMENTS

| | | | |
|---|---|---|---|
| 3,872,680 A | | 3/1975 | Nicholson et al. |
| 4,157,023 A | * | 6/1979 | Tisdale et al. ................ 72/161 |
| 4,201,074 A | * | 5/1980 | Cox ............................ 72/168 |
| 4,297,054 A | * | 10/1981 | Yenzer et al. ............ 405/168.3 |
| RE30,846 E | * | 1/1982 | Lang et al. ................. 405/168 |
| 4,434,319 A | * | 2/1984 | Gomi et al. ................... 174/13 |
| 4,992,001 A | | 2/1991 | Harrison |
| 5,312,205 A | * | 5/1994 | Wicks, III ............. 137/247.41 |
| 5,403,121 A | | 4/1995 | Lanan |
| 6,554,538 B2 | * | 4/2003 | Stockstill ................. 405/168.3 |

FOREIGN PATENT DOCUMENTS

| | | | |
|---|---|---|---|
| GB | 2287297 A | 9/1995 | |
| JP | 53089996 | * 8/1978 | ................. 405/158 |
| NO | 158234 | 4/1988 | |
| NO | 175223 B | 6/1994 | |
| NO | 19965434 L | 6/1998 | |

* cited by examiner

*Primary Examiner*—Jong-Suk Lee
(74) *Attorney, Agent, or Firm*—Foley & Lardner LLP (57) ABSTRACT

A method for laying a pipeline on the sea bed from a lay barge in order to achieve controlled thermal expansion, comprises the following steps: Feeding out of the pipeline having a radius of initial residual curvature from a pipeline reel, preferably via a stinger to a curvature device where a radius of reversal curvature is applied to the opposite side of the pipeline with respect to the radius of initial residual curvature when the pipelines is passing through the curvature device. The curvature device straightens out the pipeline to longer, mainly straight portions with length having a radius of residual curvature which is larger than a desire minimum radius of residual curvature. The curvature device exposes shorter portions of the pipeline with a length for a radius of counter curvature forming the thermal expansion loops having a radius of residual curvature which is less than a desired maximum radius of residual curvature for the thermal expansion loops. The result is controlled pipe deflection under thermal expansion of the pipeline in operation position on the seabed and under operational loads, in that the deflection of the pipeline may appear in the thermal expansion loops of the pipeline.

13 Claims, 5 Drawing Sheets

METHOD FOR PIPELAYING FROM A COIL TO THE SEA BED, CONTROLLING THERMAL EXPANSION

This application is a section 371 national stage application from PCT International Application No. PCT/NO02/00023, filed Jan. 17, 2002.

The invention relates to a method for laying a pipeline on the sea bed by means of a pipe laying vessel, for controlled thermal expansion. More precisely the application relates to a method for varied reversed deflection of the pipeline subsequent to the pipeline being plastically bent when fed along a curved portion of a stinger, or subsequent to storage on a reel and subsequently reeled out.

PRIOR ART ON THE FIELD OF TECHNIQUE

A method for laying a pipeline is shown in U.S. Pat. No. 4,992,001; "Method of deepwater pipelay". The method comprises laying in water depths greater than 100 feet, where the pipeline is assembled on board a lay barge. During deployment as the pipelines is fed out, it is bent beyond typical elastic bending limitation while passing along a stinger where it is subsequently reverse bent to remove any permanent curvature. Upon further deployment into the sea, a generally horizontal axial load is maintained in the pipeline as it eventually comes to rest on the sea floor such that the final in-situ residual bending curvature of the pipeline is nearly zero or falls within an acceptable range.

U.S. Pat. No. 5,975,802 describes a pipelaying vessel with production of the pipeline on the deck and a production line guiding the assembled pipeline to a stinger having means for regulating its angle of inclination when the pipeline is fed into the sea. The stinger comprises a clamping mechanism for the pipeline and a mechanism for straightening the pipeline in order to remove non-elastic bending as in U.S. Pat. No. 4,992,001. The pipeline may be fed out in forward direction from the fabrication station on the deck and then have its direction and movement reversed to lay over the stern or be fabricated in an aft direction, laid over the stern. A paper by Lana, G. A: "Mobile Bay Fairway Field Flowline Project", OTC 7014, Offshore Technology Conference, Houston, Tex., 1992, also disclosed in Lanan's U.S. Pat. No. 5,403,121, describes a pipeline laid in zigzag configuration along the seabed in order to allow the pipeline to expand or contract sidewise when exposed to increasing or decreasing temperatures. Prefabricated double jointed pipes having a loop length of approximately 23 meter and a bend angle of 8° are joined to a pipeline on deck and fed out into the sea via a stinger. Lanan describes in the patent specification column 1, line 22–30: "The suspended pipe span between the vessel stern and the seafloor is typically supported by a stinger attached to the vessel stern and axial tension applied to the pipe. Applying this tension to the pipeline incorporating expansion lops will exceed the elastic stress limit of a typical expansion loop. Typical expansion lops would also not pass easily through the lay barge pipe tensioning machine or stinger". Lanan shows a technical prejudice in that tensional force during laying of a pipeline with expansion loops will exceed the elastic tension limits for a typical expansion loop. This is not the case according to the present invention.

GB 2,287.297 describes a method for laying undersea pipelines comprising forming the pipeline from straight pipe sections and then importing alternately oppositely directed loops on the pipeline which is then laid undersea. A bending station with a set of three transverse, horizontally directed pairs of hydraulic pistons, each pair of pistons being opposite each other and designed to press towards the pipe, bend the pipe sidewise to required degree.

DESCRIPTION OF THE PROBLEM

Usually the pipeline on the seabed transporting oil and gas under high pressure and temperatures will be exposed to axial compressive forces, which may cause the pipeline to buckle, so called pipe buckling, and where the strain and stress in the buckled pipe exceeds the criteria for acceptance and my cause collapse of the pipeline. It is therefore common practice either to place the pipeline in a ditch and/or cover it by means of gravel in order to keep it in place. Such ditching or gravelling is expensive and may cause conflict with other interested parties, for example it may cause impact on, or prevent fishery. Ditching and gravelling may in most cases be superfluous if one succeeds in transfer or in any manner reduce the axial loads in a controlled manner, for example through controlled deflection several places, whereby local buckling and excessive stresses and strains, which normally would appear in straight pipelines, may be avoided.

A pipeline which is exposed to increase in temperature will have a tendency to extend in longitudinal direction. Because of interaction between the pipe and the soil in the form of friction and cohesion the extension in longitudinal direction will be prevented and axial compressive force will occur. In pipelines which are so long that interaction between the soil and the pipeline prevents expansion of the middle portion towards the ends do not provide other possibilities of longitudinal extension than by buckling of the pipeline and deflections in the horizontal or vertical plane. Such buckling may usually be prevented by complete ditching with a cover, and increase in temperature will produce an increased axial compressive strain. A partly buried or openly laid pipeline will in case of an increase in temperature be exposed to buckling, called upheaval buckling, which locally may be substantial, in particular if the entire increase in length along a portion of the pipeline is concentrated in one single buckling. In this context this phenomenon is called localising. The bending strains may locally in the deflection area be so high that they exceed allowed strain limits.

An offshore pipeline which is intended to transport gas and/or fluid having a high temperature, such as for example unprocessed well stream between a production plant and a processing plant, is constructed to prevent upheaval buckling, for example by being trenched and covered by continuous or discontinuous backfill of gravel, by laying the pipeline along a snaked route, by laying the pipeline in a larger casing, or by including expansion loops in the pipeline along its length. These solutions may be extremely expensive, or they may also leave uncertainty from a functional point of view.

Conventional installation methods provide a built-in tensional force in the pipe subsequent to laying on the seabed. When calculating the compressive force, tending to produce buckling, the axial tensional force from the laying operation is subtracted from the compressive force mobilized as a result of increase in temperature. It may therefore be assumed that laying with a high axial tension may contribute to reduction of or the prevention of buckling. The relative increase in length of steel as a consequence of normal temperatures during transfer of well fluid stream (which may be in the order of 100° C.) may, however, be substantially larger than the extension normally appearing due to tensional force in the pipeline caused by laying. Axial tension may thus normally only compensate for a very limited increase of temperature.

One of the objects according to the invention is, at certain intervals, to give portions of the pipeline less stiffness so that extension in axial direction due to temperature may occur in a distributed and controlled manner and cause pipe deflections without producing large compressive forces. This is achieved by forming loops, hereinafter called thermal expansion loops, in the pipeline during installation, in such manner that the pipeline in unloaded condition forms evenly distributed and sidewise oriented expansion loops in the longitudinal direction of the pipeline. When the pipeline is exposed to axial tension corresponding to normal tension during laying, the pipe will, in addition to extension as a direct consequence of the tensional force, be extended as the thermal expansion loops are partly straightened out, i.e. it becomes pre-stressed. At the same time bending moments will appear in the pipe having a maximum value corresponding to the tensional force times the reduction in the amplitude of the thermal expansion loops in loaded conditions. Said bending moments will when the tension is relieved, force the geometry back to the original configuration of the expansion loops when in unloaded condition.

Large increases in temperature will lead to a net compressive force in the pipeline, which for maximum temperature, however, will be substantially lower than in case the pipeline had been without loops, see FIG. 6 and the description of the Figure below. Due to the evenly distributed loops the tendency of an aggregated increase in length at one single location, localizing the extension in length will be avoided. Strains are reduced correspondingly since the extension in length will be evenly distributed between the various expansion loops.

The geometry of the pre-bent curves of the thermal expansion loops should be such that the stiffness in longitudinal direction will be substantially less than the axial stiffness for a straight pipe. It is an advantage that the radius of the residual curvature of the thermal expansion loops are greater than 250 times the diameter of the pipe, since this corresponds to the radius of curvature when a substantial straight pipe with typical material properties are bent to its elastic limit, i.e. such that no plastic deformation is obtained.

SHORT SUMMARY OF THE INVENTION

The above mentioned problems may be solved by a method for laying a pipeline on the seabed from a lay barge, for controlled thermal expansion, comprising the following steps:

Feeding a pipeline having a radius of initial residual curvature, either from a reel or caused by bending over the top of a stinger, to a bending apparatus where a radius of reversal curvature formed in any known manner is applied as the pipeline is passing through the curvature means to the opposite side of the pipeline with respect to the radius of initial residual curvature.

The bending apparatus straightens out the pipeline to longer, mainly straight portions having a radius of residual curvature larger than a desired minimum radius of residual curvature.

The bending apparatus exposes shorter portions of the pipeline to a radius of reversal curvature forming thermal expansion loops having a radius of residual curvature which is less than a desired maximum radius of residual curvature for the thermal expansion loops.

The result of the steps of this method is that controlled pipe bending under thermal expansion of the pipeline in operational position on the sea bed and under operational loads is obtained in that the deflection of the pipeline may appear in the thermal expansion loops already at small compressive forces.

According to a preferred embodiment of the invention, where the expansion loops are given a radius of residual curvature which is larger than the elastic radius of curvature of the pipe, whereby an axial strain only will straighten out the expansion loops elastically, and in order to avoid straightening out the expansion loops plastically, the technical prejudice in Lanans patent is proved to be incorrect. The elastic strain limits for a typical expansion loop will not be exceeded, and the expansion loops will be able to pass through the strain machines or the stinger on the lay barge, since they have a radius of residual curvature which is larger than the elastic radius of curvature of the pipe. Hence, the expansion loops have a smaller residual curvature than the elastic curvature of the pipe, and will thus not be straightened out at elastic tension.

According to a beneficial embodiment of the invention the pipeline is fed out from a pipeline reel. Hence, a rapid and continuous feeding out of the pipeline is achieved.

According to a preferred embodiment of the invention all expansion loops are formed towards the same side of the pipeline, enabling bending of the pipeline to take place in the same direction in the thermal expansion loops of the pipeline. According to a preferred embodiment the thermal expansion loops are formed in such way that they become convex upwardly in a vertical plane when the pipeline is fed from of the curvature means and in a most preferred embodiment with such radius of residual curvature, length and frequency that each and every expansion loop rotates from a vertical orientation to a horizontal orientation as the laid pipeline is stabilised on the seabed.

BRIEF DESCRIPTION OF THE DRAWINGS

Below a figure explanation of the enclosed drawings is given. The drawings shall not be construed in any way to limiting the invention, but shall only be construed as illustrations and to simplify the understanding of the invention, which only shall be construed in view of the enclosed claims.

DESCRIPTION OF A PREFERRED EMBODIMENT OF THE METHOD ACCORDING TO THE INVENTION

The invention relates to a method for laying a pipeline (1) on the sea bed from a pipeline lay barge (10).

An example of the dimensions of an actual pipeline (1) may be as follows:

| | |
|---|---|
| Steel material quality: | X65 |
| Internal diameter: | 250 mm |
| Wall thickness: | 13.9 mm; D/t = 20 |
| Operation data: | |
| Water depth: | 200 m |
| Internal pressure: | 30 Mpa |
| Increase of temperature: | 100° C. |
| Submerged weight (air filled pipe): | 200 N/m |
| Submerged weight (in operation): | 500 N/m |
| Lateral coefficient of friction $\mu_s$: | 1.0 |
| Axial coefficient of friction $\mu_a$: | 0.5 |
| Installation data: | |
| Reel Radius: | 8 m |
| Angle of departure for the pipeline: | 60°, counted between the pipeline axis and the horizontal plane/the plane of the deck of the lay barge |
| Local residual strain: | 0.12%, corresponding to a residual curvature 8.64 $E^{-3}m^{-1}$ = residual radius of curvature 116 m in the portion where the tube is only partially straighten out, see below for further explanation. |

Figures 3, 4A, 4B:
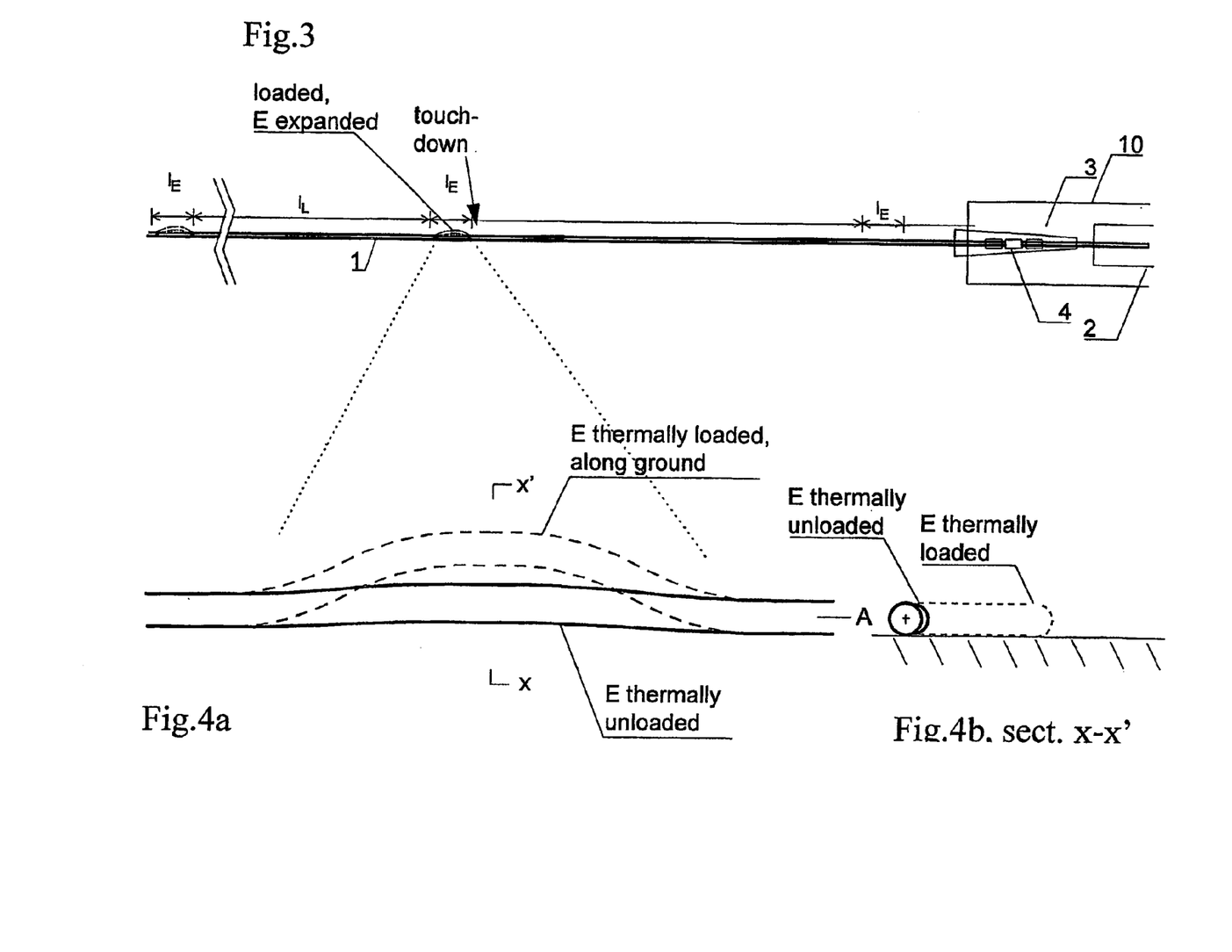
FIG. 3 illustrates a horizontal view, seen straight down towards the sea bed of a deployed pipeline according to the invention, where the portions having expansion loops show deflection.
FIG. 4a is a horizontal view and illustrates an enlarged portion of the pipeline on FIG. 3. The Figure illustrates a cold laid expansion loop on the pipeline and deflection of the expansion loop on the pipeline at working loads caused by temperature and pressure in the pipeline.
FIG. 4b is partly a section and partly a vertical view seen along the pipeline, and illustrating an expansion loop in cold and in warm, deflected condition.

The object of the invention is to achieve a controlled thermal expansion, limited to certain expansion loops (E) which according to the method is formed along the pipeline. An illustration of expansion loops is shown on FIG. 3. The method comprises the following steps:

The pipeline (1) is fed out from a pipeline reel (2) onboard the lay barge, preferably via a stinger (3), to a curvature means (4). This situation is described in the prior art, and is illustrated on FIG. 1. The pipeline will have a start residual curvature radius ($R_{rInit}$) since it is reeled out from a pipeline reel (2) having commonly a reel radius of curvature which is less than the elastic radius of curvature and as a consequence, it has been bent plastically. The initial residual radius of curvature ($R_{rInit}$) may also appear when the pipeline is passing over the portion at the top of the stinger (3), where the radius of the curved portion may correspond to the radius of the pipeline reel. Situations were the stinger is superfluous, may also be feasible, the pipeline running directly from the reel towards the deflection means. The pipeline may be continuous fed to the deflection means (4) where a radius of reversed curvature ($R_{mk}$) is added to the opposite side of the pipeline (1) with respect to the radius of initial residual curvature ($R_{rInit}$), the pipeline (1) running through the deflection means (4).

The deflection means (4) straightens out the pipeline (1), producing long, mainly straight portions (L) having a designed length ($l_L$), and forming a radius of residual curvature ($R_r$) which is larger than an intended minimum radius of residual curvature ($R_{rMin}$). Said radius of minimum residual curvature will for straight portions in theory approaches indefinite, but not completely, in reality.

Figure 2:
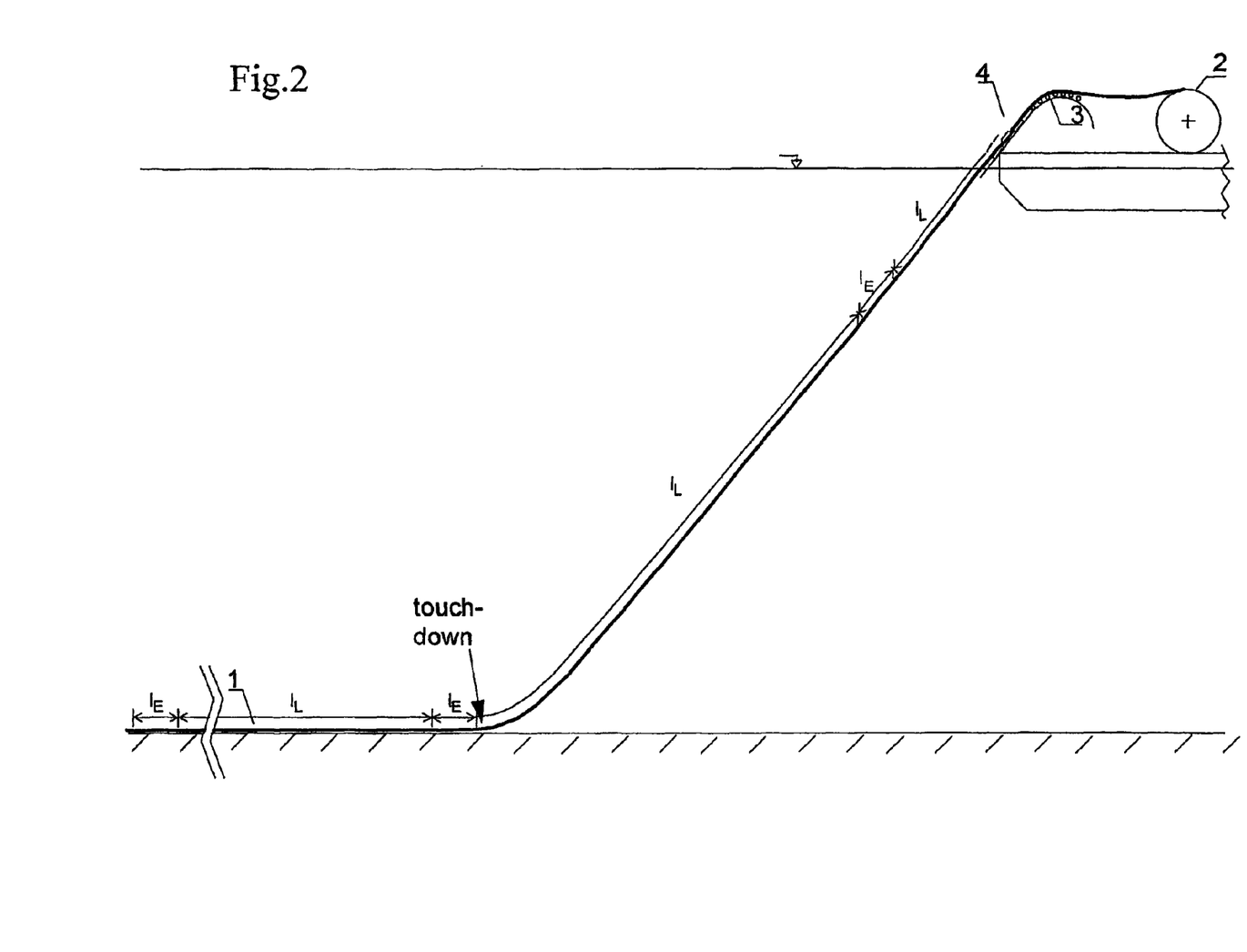
FIG. 2 illustrates a side view of the lay operation of a pipeline, indicating sections of expansion loops on the pipeline.

One feature of the invention is that the deflection means (4) exposes shorter portions of the pipeline (1) having a length ($l_E$) for a radius of residual curvature ($R_E$), forming thermal expansion loops (E) with a radius of residual curvature ($R_E$) which is less than an intended largest radius of residual curvature ($R_{EMax}$) for the thermal expansion loops (E). Said expansion loops are illustrated in FIG. 2 and also in FIGS. 3 and 4. The pipeline may in general consist of longer straight portions (L) having expansion loops (E) mainly evenly distributed along the pipeline, whereby controlled pipe bending during thermal expansion if the pipeline (1) in operational position on the seabed and during operational loads is obtained by allowing bending to occur already at small axial compressive loads in the thermal expansion loops (E), and in general not in the straight portions. A pipeline laid according to the invention is somewhat shorter. The pipeline is fed continuously out, and consequently faster and cheaper than a zigzag pipeline as shown in GB 2,287, 297, where feeding of the pipeline normally have to stop during bending of the pipe by means of the laterally arranged pistons. Other advantages according to the invention appear more clearly when read in conjunction with the disclosure of the invention below.

According to a preferred embodiment of the invention, where the expansion loops (E) is given a residual radius of curvature ($R_E$), which is larger than the elastic radius of curvature of the pipe, it is achieved that for axial tension the pipe will only straighten out the expansion loops (E) elastically, thereby avoiding that plastically straightening of the expansion loops (E) will occur when the pipeline is exposed to tension. The pipeline is exposed to tension both due to the weight of the portion which at any time is between the vessel and the seabed, and due to horizontal tension produced by the lay barge. If the axial tension is given the possibility of producing plastic straightening of the pipe, this plastic straightening will occur in weak places on the tube, and consequently the properties of the pipe at such portions will remain unidentified. This should be avoided. For axial tension of the expansion loops according to this preferred embodiment of the invention, an equal straightening moment will be employed on the entire pipeline, thus the problem of unknown pipeline properties due to plastic deformations will not appear.

Analysis of Installation

Figure 1:
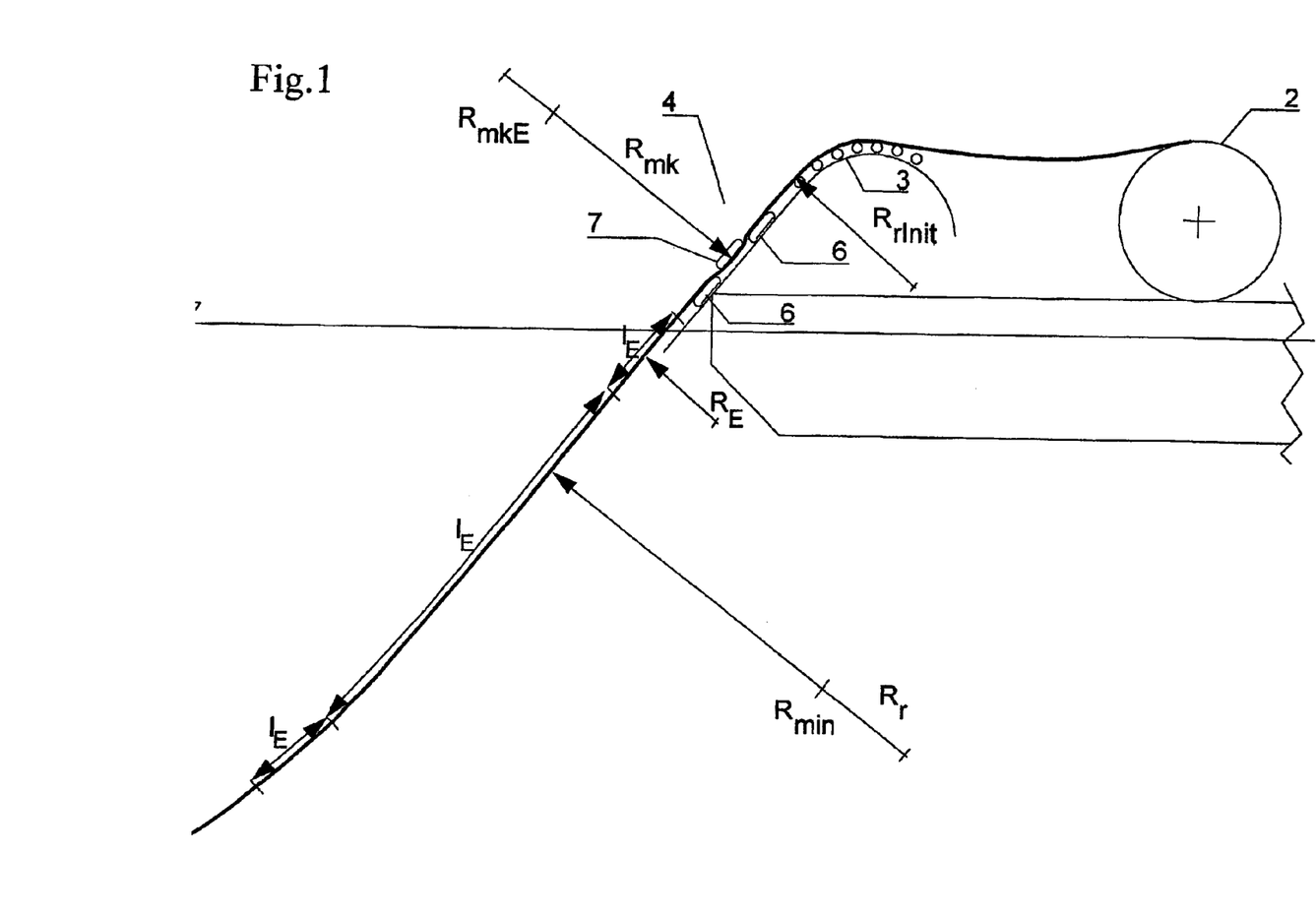
FIG. 1 illustrates a preferred embodiment of the method according to the invention, showing a side view of a vessel provided with a pipeline reel and a straightening means for the pipeline.

A pipeline leaving the lay barge, see FIGS. 1 and 2, where the pipeline has a residual curvature which is upwardly convex will be sensitive for rotation in the free span between the lay barge and the sea bed, where the curvature is opposite of the residual curvature and upwardly concave. Calculations have been made, based on pure energy considerations of the bending and torsion, predicting the rotation of the pipeline in the free span. The analysis of installation shows that with an exit angle of 60° and a water depth of 200 metres the span between the sea surface and the seabed will be approximately 360 metres. Maximum pulling stretch in the under bend will be well inside accepted values for relevant border conditions.

Rotation of the pipeline due to residual curvature will increase with the distance from the lay barge as the pipeline approaches the seabed. Since rotation is caused by the residual curvature in the pipeline the installed pipe will not be left with torsional moment on the seabed; only a bending moment, provided the rotation takes place to the same side as the pipelying is proceeding. This is predominantly probable; once the rotation first has "chosen" side with an expansion loop (E) the subsequent straight portion (L) of the pipeline and the next expansion loop (E) gain an increased probability for bending over to the same side. The torsional moment in the pipeline has thus its maximum value when leaving the lay barge and decreased towards the seabed where the torsional moment becomes zero.

Figure 5:
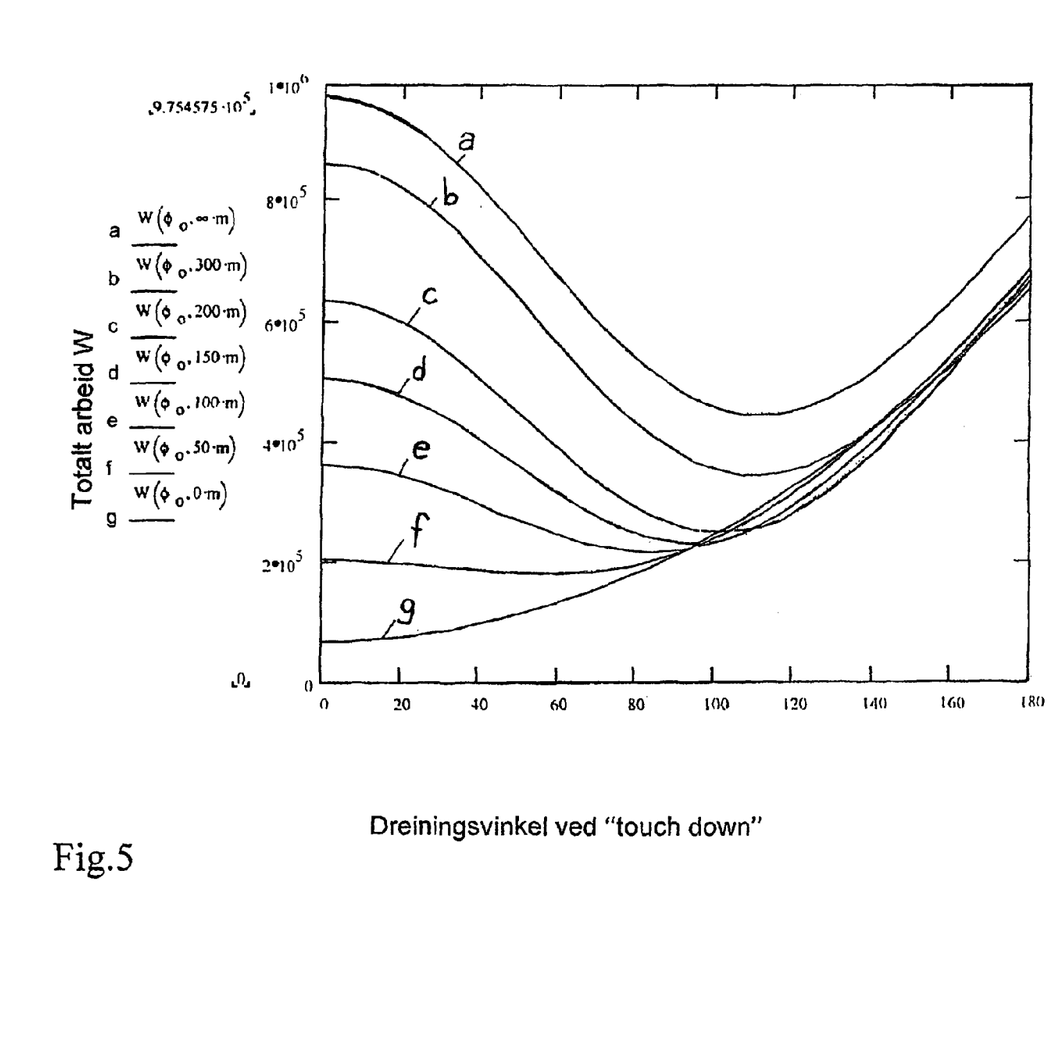
FIG. 5 illustrates the total work required for bending and torsion of the pipeline in the free span from the lay barge towards the sea bed for different lengths with residual deflection in the pipeline.

FIG. 5 shows the total work performed in order to bend and twist the pipeline from the sea level down towards the seabed for angles of rotation between 0° and 180°. Curves are calculated for different lengths $l_E$ of the thermal expansion loops (E).

a) $l_E$=the entire length of the pipeline
b) $l_E$=300 m
c) $l_E$=200 m
d) $l_E$=150 m
e) $l_E$=100 m
f) $l_E$=50 m
g) $l_E$=0 m, i.e. no residual curvature FIG. 5 illustrates this work for cases a) to g). The curves indicate much of the probability for rotation due to residual curvature.

If the curve is evenly increasing energy must be supplied in order to achieve rotation.

If the curve is relatively flat at small angles and thereafter increases, then the system is relatively unstable and the pipeline may twist to an angle and will require additional energy in order to twist to a larger angle.

If the curve initially has a negative inclination the twisting may easily be initiated. If the curve also has a distinct minimum point, the angle of twist of the pipeline at the seabed will be in the angle area where the curve has its point of minimum. FIG. 5 shows that in order to achieve 80° to 100° rotation of the pipeline the expansion loops (E) should have lengths $l_E$ in the range between 100 m and 150 m for this example. The twisting is favourable, since the expansion loops formed in the vertical plane thus turn over to the side and ends in the horizontal plan along the seabed. This is ideal for further sidewise deflection at the changes in pressure and differences in temperature appearing during operational loads.

Figure 6:
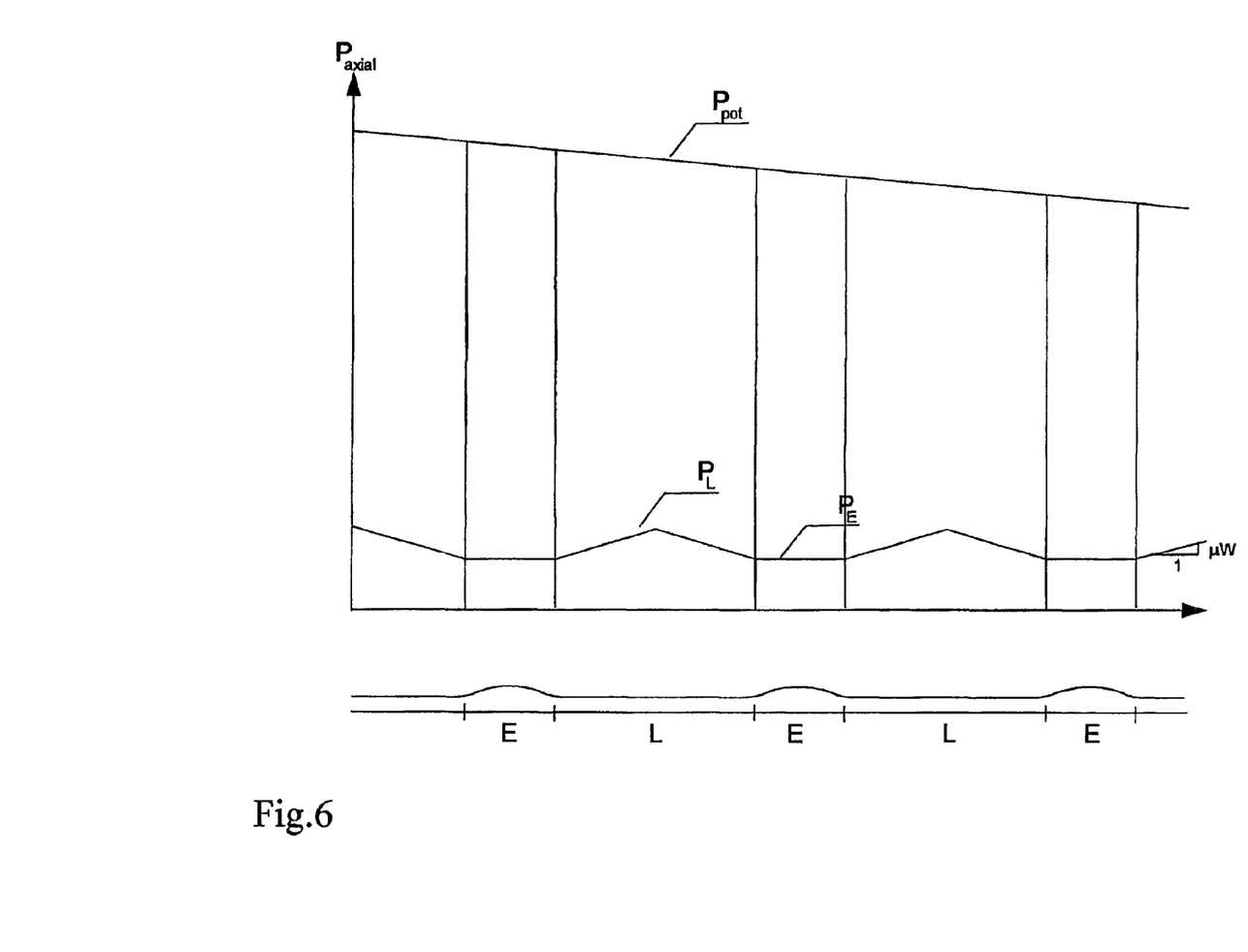
FIG. 6 shows two curves where the upper curve shows the potential compressive force in a pipeline without appreciable rest curvature and without expansion loops, while the lower curve illustrates the effective axial compressive force caused by expansion in a pipeline according to the invention with expansion loops having lengths $l_E$ between straight portions having lengths $l_L$.

FIG. 6 shows two curves where the upper curve shows the potential effective pressure force $P_{pot}$ in a pipeline restrained from axial and sidewise expansion, while the lower curve illustrates how the effective axial compressive force is strongly reduced due to distributed expansion in a pipeline according to the invention with expansion loops having length $l_E$ at axial compressive force $P_E$ between straight portions of length $L_L$ with axial compressive force $P_L$.

According to a preferred embodiment of the invention, residual curvature in the expansion loop (L) will be formed on the same side of the pipeline (1) enabling bending of the pipeline to appear in same direction in the thermal expansion loops (E) of the pipeline. In the most preferred embodiment of the invention, the residual curvature is formed so that the thermal expansion loops (E) are convex upwardly in a vertical plane when the pipeline is leaving the curvature means (4).

In a method according to the invention the curvature means (4) used, comprises two reversal rollers (6) arranged on one side of the pipeline (1), on the disclosed embodiment, on the underside. An intermediate, opposite acting curvature reversal roller (7) runs on the opposite side of the pipeline (1). The rollers (6, 7) form the radius of counter curvature ($R_{mk}$) on the pipeline (1), while running through the curvature means (4), and the pipeline will have a radius of residual curvature subsequent to elastic reversal bending if not subjected to strain or tension along the stinger (3) subsequent to passage through the curvature means.

According to the preferred embodiment of the invention an adjustable power means (8) designed to vary the position of the curvature reversal rollers (7) and thus the pressure force against the pipeline (1) and indirectly against the reversal curvature (6) in order to regulate the radius of the counter curvature ($R_{mk}$), is applied. Such regulation of the position of the reversal curvature rollers is described in prior art solutions, for example in U.S. Pat. No. 4,992,001, in order to adjust the distance of the rollers with respect to the pipeline and in order to provide the required counter curvature bending of the pipeline. According to the present invention, however, said rollers are used to regulate the radius of counter curvature to form straight portions and expansion loops, respectively.

According to a preferred method of the invention, portions having desires length ($l_E$) of the pipeline (1) are given a smaller reversal bending with a larger radius of counter curvature ($R_{mkE}$). Hence, the radius of counter curvature ($R_{rInit}$) inherit from the reel (2) or the stinger may be exploited, thereby forming thermal expansion loops (E) having a radius of counter curvature ($R_E$) in the same direction as the radius of initial start-residual curvature ($R_{rInit}$). According to this preferred embodiment of the invention the pipeline is upwards concave when entering the curvature means (4) and the counter curvature roller (7) is released to desired degree in order to form each thermal expansion loop. In such manner an insignificant amount of energy is in praxis saved by employing the preferred method.

It is possible to expose the pipeline (1) for a continuous varying radius of counter curvature ($R_{mk}$) in the curvature means at the transition between formation of the straight portions (L) and the expansion loops (E).

The pipeline (1) in the free span between the lay barge (10) and the seabed is exposed for a certain elastic elongation which in the main straightens out the expansions loops (E). The installed pipeline will have a certain inherent axial tensional force when in cold conditions., whereby the elastic elongation will not be completely reversed when the tensional forces in the pipeline is reduced subsequent to the pipeline resting on the seabed. The expansion loops (E) will prior to settling on the seabed contain a minimum of energy which is a function of an axis of rotation about a longitudinal axis (A), sufficient to rotate the expansion loops (E) from the vertical plane and mainly into the horizontal plane towards the seabed. Dependent upon the properties of the pipeline material, dimensions, tensional forces appearing, the laying geometry and the radius of residual curvature, together with the lengths of the expansion loops, said minimum of energy may appear at different angles, see FIG. 5. It is an advantage if said minimum of energy will turn the concave residual curvature along the seabed, laterally with respect to the route of the pipeline.

In the preferred embodiment of the invention the length ($l_E$) of the portions of expansion loops (E) is made shorter than the length ($l_L$) of the straight portions (L). In a more preferred embodiment this proportion is less than 1:4, and in a further preferred embodiment the proportion is less than 1:10. It is preferred that the expansion loops are repeated every 100 m. More preferably said distances may exceed 500 m, and for a still more preferred embodiment the expansion loops are recurring with a distance more than 1000 m.

Usually a pipeline reel standing in an upright position, having a horizontal axis (20) of rotation, arranged in transverse direction with respect to the direction of motion of lay barge (10) is used. It is also possible to use a reel having a vertical axis (20) of rotation. In the illustrated method according to the invention the pipeline (1) is fed out in rear direction from the top of the reel.

According to a possible embodiment of the invention at least a middle portion of the straight portions (L) of the pipeline (1) is covered so that the portions on each side of the middle part is allowed to expand axially towards each expansion loops (E). Alternative ways of securely position these middle portions on the seabed may also be used.

The present method for controlling the back bending in the vertical plane provides for possibilities of adapting the shape of the pipeline to the seabed topography in order to prevent buckling over ridges and long free spans over ditches. According to a preferred method of the invention the curvature means (4) may expose portions of the pipeline (1) having lengths ($l_T$) for a radius ($R_{mkT}$) of counter curvature forming topographically adapted loops (T) having a radius of residual curvature ($R_T$) corresponding to topographical ridges and bottom points along the route of the pipeline (1), whereby the pipeline (1) in operational position on an uneven seabed achieves reduced peak moments and reduced lengths of span when crossing topographical ridges or bottom furrows.

What is claimed is:

1. A method for laying a pipeline on a sea bed from a lay barge in order to provide controlled thermal expansions, comprising:

feeding the pipeline from a pipeline reel, preferably via a stinger, where the pipeline has a radius of initial residual curvature, to a curvature means where a radius of counter curvature is applied on opposite side of the pipeline with respect to the radius of initial residual curvature when the pipeline is running through the curvature means, wherein the curvature means straightens out the pipeline to longer, mainly straight portions having a length with a radius of residual curvature greater than a predetermined smallest radius of residual curvature; and the curvature means exposes shorter portions of length of the pipeline for a radius of counter curvature forming thermal expansion loops having a radius of residual curvature which is less than a predetermined largest radius of residual curvature for the thermal expansion loops;

whereby a controlled deflection of the pipe during thermal expansion of the pipeline in operational position on the sea bed and when exposed to operational loads is achieved in that deflection of the pipeline may appear in the thermal expansion loops of the pipeline, wherein all thermal expansion loops are formed toward the same side of the pipeline, whereby bending of the pipeline may occur in same direction in the expansion loops of the pipeline.

2. The method according to claim 1, wherein the expansion loops are given a radius of residual curvature which is larger than the radius of elastic curvature of the pipe, whereby only the expansion loops will be straightened out elastically when exposed to axial tension, avoiding plastic straightening of the expansion loops.

3. The method according to claim 1, wherein the thermal expansion loops are formed in such way that they become convex upwards in a vertical plane when the pipeline leaves the curvature means.

4. The method according to claim 1, wherein the shorter portions of length of the pipeline are given a smaller deflection with a larger radius of counter curvature and thus form thermal expansion loops having a radius of residual curvature in same direction as the original radius of initial residual curvature.

5. The method according to claim 4, wherein the expansion loops just before and during laying towards the sea bed will have an energy minimum as a function of a rotational angle around a longitudinal axis which is sufficient to rotate the expansion loops mainly sidewise, towards the sea bed.

6. The method according to claim 1, wherein the length of the portions of the expansion loops is made shorter than the length of the straight portions.

7. The method according to claim 6, wherein the proportion between the length of the shorter portions of the pipeline and the length of the straight portions is less than 1:4.

8. The method according to claim 6, wherein the proportion between the length of the shorter portions of the pipeline and the length of the straight portions is less than 1:10.

9. The method according to claim 6, wherein the expansion loops are recurring with a distance exceeding 100 m between each start of a new expansion loop.

10. The method according to claim 6, wherein the expansion loops are recurring with a distance exceeding 500 m between each start of a new expansion loop.

11. The method according to claim 6, wherein the expansion loops are recurring with a distance exceeding 1000 m between the start of a next expansion loop.

12. The method according to claim 1, wherein the curvature means exposes portions of the pipeline with length for a radius of counter curvature forming loops adapted to the topography and having a radius of residual curvature corresponding to the topographical shoulders and bottom points along the projected route for the pipeline;

so that the pipeline in operational position on an uneven seabed and subjected to operational loads achieves reduced moment maximums and reduced length of span when crossing topographical shoulders or bottom points.

13. The method according to claim 1, wherein the pipeline is positioned on the sea bed when in the operational position.

* * * * *